March 2, 1937.  J. M. WEYDELL  2,072,832
CLUTCH
Filed Feb. 8, 1932   2 Sheets-Sheet 1
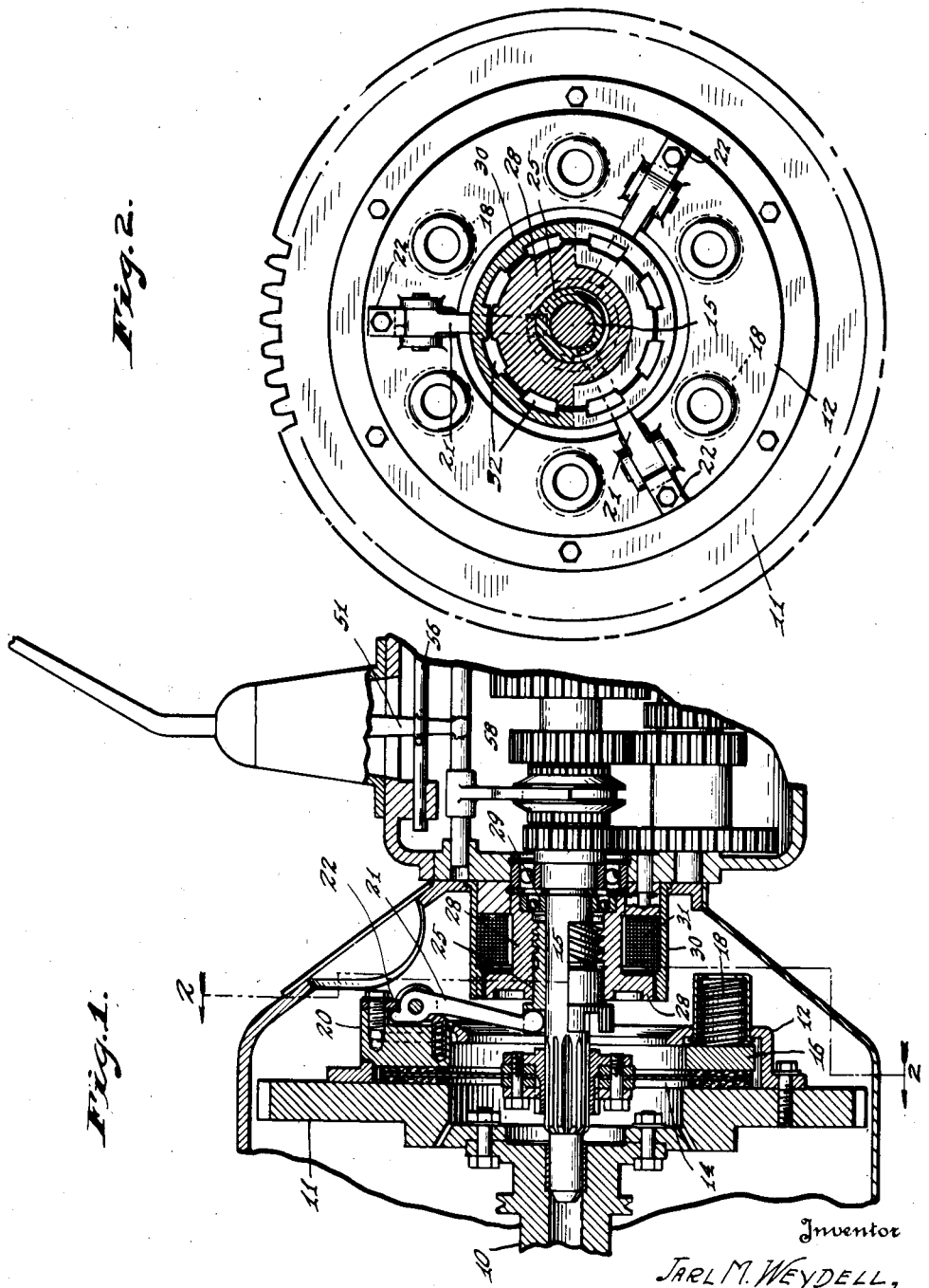

March 2, 1937.  J. M. WEYDELL  2,072,832
CLUTCH
Filed Feb. 8, 1932   2 Sheets-Sheet 2
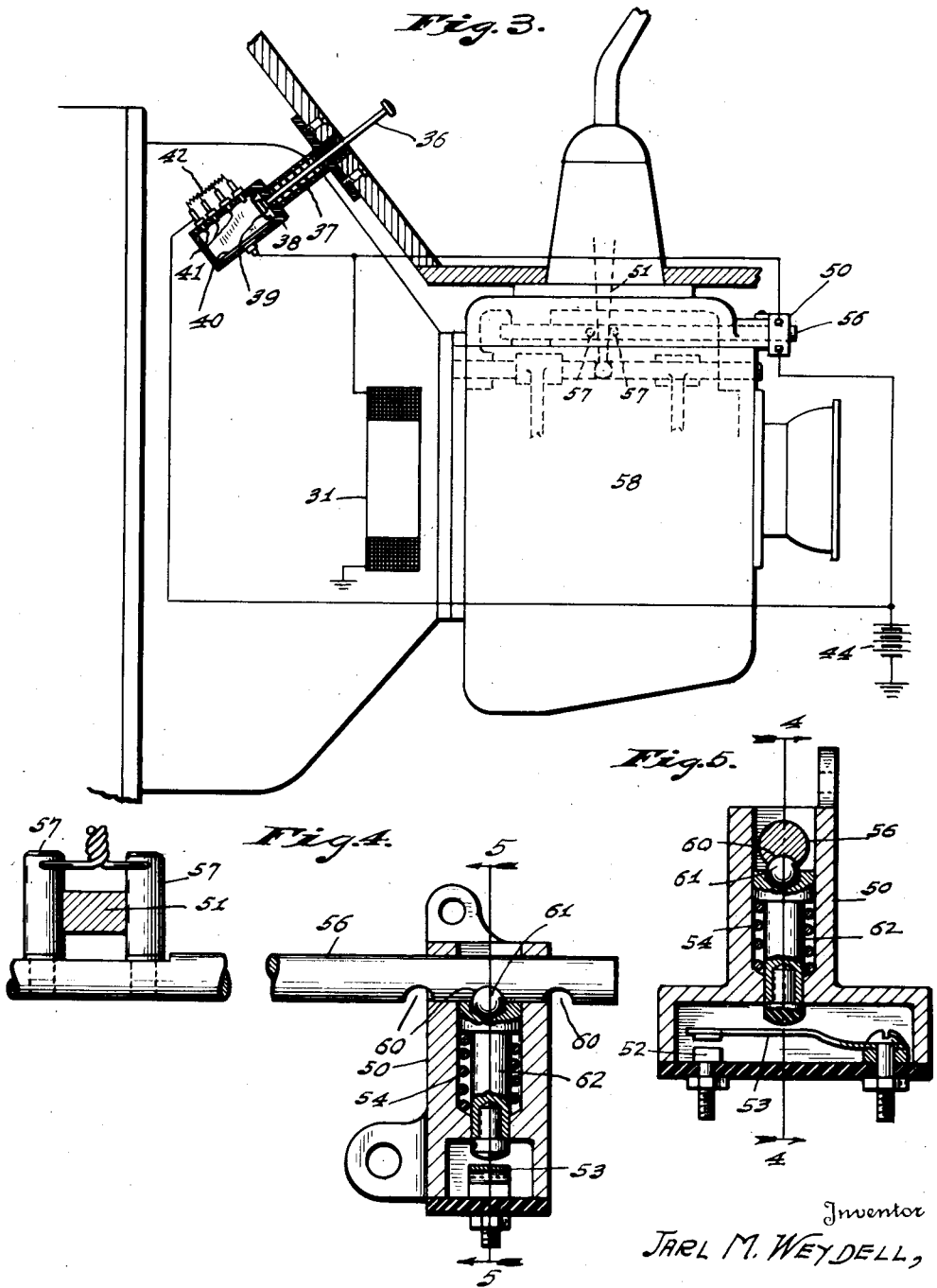
Inventor
JARL M. WEYDELL,
By
Attorneys Patented Mar. 2, 1937

2,072,832

UNITED STATES PATENT OFFICE

2,072,832

CLUTCH

Jarl M. Weydell, Indianapolis, Ind., assignor of one-half to Edward E. Stout, Indianapolis, Ind.

Application February 8, 1932, Serial No. 591,577

9 Claims. (Cl. 192—3.5)

It is the object of my invention to produce a power-transmitting clutch, particularly a clutch suited for use in the power-transmitting system of an automobile. More specifically, it is my object to produce a clutch of this type which will have a great flexibility of control, which will lend itself to automatic actuation, and which may be easily and positively operated.

In carrying out my invention I associate with a clutch having relatively rotatable clutch members one of which may be axially moved to effect the engagement and disengagement of the clutch a control means embodying a control member which is rotatable with one of the clutch members and which is axially movable to control engagement and disengagement of the clutch. I provide means, preferably of a yielding character, for causing engagement of the clutch; and to effect release of the clutch, I associate with the clutch control member an element which is screw-threadedly connected to the control member and which co-operates with an electro-magnetic brake, the brake serving upon energization and upon rotation of the control member to cause relative rotation of the control member and the braked element, whereby the control member will be moved to effect disengagement of the clutch.

A number of different means may be employed to control the energization of the electro-magnetic brake. For example, the brake may be controlled through the medium of a switch operated by the usual gear-shift lever of the automobile to effect disengagement of the clutch immediately prior to gear-shifting and to effect re-engagement of the clutch at the conclusion of gear-shifting. Control of the clutch may also be exercised by a manually operated rheostat by which gradual engagement of the clutch may be accomplished.

The accompanying drawings illustrate my invention:

Fig. 1 is a vertical longitudinal section showing the main clutch of an automobile engine and a portion of the change-speed transmission mechanism associated therewith; Fig. 2 is a transverse section on the line 2—2 of Fig. 1; Fig. 3 is a side elevation of the clutch-housing and the change-speed casing of an automobile illustrating diagrammatically two different means by which the automobile clutch may be controlled these means comprising respectively a pedal-adjusted rheostat and a switch operated by the control lever of the change-speed transmission mechanism; Fig. 4 is a plan view illustrating details of the control-lever-operated switch and its operating mechanism, the switch itself being illustrated in section on the line 4—4 of Fig. 5; and Fig. 5 is a transverse section on the line 5—5 of Fig. 4 showing further details of the switch and its operating mechanism.

The clutch illustrated in the drawings is shown as the main clutch of an automobile. In that construction, there is secured to the rear end of the engine crank shaft 10 the usual flywheel 11 and on the rear face of that flywheel there is mounted an annular member 12 shaped to provide between it and the flywheel a space within which the clutch elements are located.

The driven clutch element is in the form of a disk 14 which is mounted to rotate with but to be axially slidable upon the clutch shaft 15 through which power is transmitted from the clutch to the usual change-speed transmission. In rear of the clutch disk 14 there is mounted an annular clutch member 16 adapted to be moved forwardly to clamp the driven clutch member 14 between it and the rear face of the flywheel. Springs 18 acting between the members 12 and 16 tend to force the member 16 forwardly to produce engagement of the clutch.

For the purpose of releasing the clutch, the member 16 is provided with angularly spaced ears or lugs 20 which extend rearwardly through slots in the member 12. On the rear face of the member 12 there are mounted a plurality of clutch-operating levers 21 corresponding in number to the ears 20. Each of the ears 20 is provided with an abutment 22 adapted to be engaged by the outer end of one of the clutch-operating levers 21 in order that by forward movement of the inner ends of the operating levers 21 the clutch member 16 may be drawn rearwardly to relieve the clamping pressure on the disk 14, and thereby to disengage the clutch.

My invention is not limited to the particular form of clutch described, as it may be used in association with other types of clutches.

The clutch control mechanism, with which my invention is particularly concerned, comprises a sleeve 25 which is axially movable upon the shaft 15 to exert forward pressure upon the inner ends of the levers 21, and which is arranged to rotate with the flywheel 11 and clutch member 16. Conveniently, the inner ends of the levers 21 extend into radial slots in the forward end of the sleeve 25 so that they serve to drive such sleeve. Through the bearing of the inner ends of the levers 21 on the bottoms of the slots in the sleeve 25, the clutch may be disengaged by forward movement of the sleeve.

The sleeve 25 is screw-threadedly received in one member 28 of a magnetic clutch, this clutch member being rotatably mounted on the shaft 15 preferably through the medium of a deep-race ball-bearing 29 capable of sustaining such end thrusts as are imposed upon the magnetic-clutch member 28 in operation. The other member 30 of the magnetic clutch is annular in form and is stationarily mounted in position to enclose the rotatable clutch member 28. The two clutch members 28 and 30 are of magnetic material and receive between them a magnet coil 31.

On opposite sides of the coil 31, the two clutch members 28 and 30 are provided with flanges adapted to complete a magnetic circuit including the two clutch members. The two flanges at the front ends of the two clutch members are provided with notches 32 which create angularly spaced pole pieces on such flanges. When the coil 31 is energized, the action of the magnetic lines of force at these spaced pole pieces tends to prevent relative rotation of the two clutch members 28 and 30.

With the parts in the position illustrated in the drawings, the clutch is engaged, the clutch springs 18 serving to clamp the driven clutch member 14 between the clutch member 16 and the flywheel. If the coil 31 is de-energized, there will be no opposition to relative rotation of the two magnetic clutch members 28 and 30; and if the shaft 10 rotates, the shaft 15, the sleeve 25, and the magnetic-clutch member 28 will rotate with it, the sleeve 25 being driven, as above described, by reason of its connection with the inner ends of the levers 21.

When it is desired to release the clutch, electric current is supplied to the coil 31. This results in the passage through the pole pieces of the flanges on the two clutch members 28 and 30 of magnetic lines of force which, as above described, tend to prevent continued rotation of the member 28.

If, under these circumstances, the shaft 10 continues to rotate, the sleeve 25 rotates with it, while the clutch-member 28, which is screw-threadedly connected to the sleeve 25 is retarded or stopped completely. Because of the resultant relative rotation of the sleeve 25 and clutch member 28 and the action of the screw-threads which interconnect these parts, the member 25 is moved forwardly. This forward movement is transmitted to the inner ends of the levers 21 which rock on their respective axes and release the main clutch member 16 from the clamping pressure which it has exerted on the driven member 14 of the main clutch.

Forward movement of the sleeve 25 continues, as the result of the action of the screw-threads through which it is connected to the magnetic-clutch member 28, until a limit of movement is reached. This limit may be provided in various ways. In the construction illustrated, I contemplate that the limit of forward movement of the sleeve 25 will be reached when the clutch member 16 engages the rear wall of the housing 12.

Further forward movement of the sleeve 25 being impossible, continued rotation of the shaft 10 will cause the magnetic-clutch member 28 to rotate in opposition to the influence of the magnetic clutch. Should the shaft 10 for any reason cease to rotate, the tendency of the sleeve 25 to rotate relatively to the clutch member 28 would cease, and spring 18, acting through the main clutch member 16 and the levers 21, would tend to force the sleeve 25 rearwardly in the clutch-member 28. The pitch of the screw-threads 26 is such that under the conditions of lubrication which will exist in practice the sleeve 25 will be moved rearwardly into the clutch member 28 by reason of this action of the springs 18. This will therefore permit re-engagement of the main clutch.

The action just described is of advantage when my clutch is embodied in an automobile, as it prevents the engine from stopping when the main clutch is disengaged, as is frequently the case in coasting.

When it is desired to re-engage the main clutch after it has been disengaged by energization of the magnetic coil 31, it is only necessary to interrupt the supply of current to such coil. When this occurs, opposition to rotation of the clutch member 28 is removed, and the springs 18 act through the main-clutch 16 and levers 21, as above described, to force the sleeve 25 rearwardly and engage the main clutch.

The clutch-control mechanism just described lends itself to great flexibility of control. One method of control to which this mechanism is admirably adapted is illustrated in Fig. 3 of the drawings. In this control arrangement, it is contemplated that the coil 31 of the magnetic clutch is under the joint control of a switch operated by the gear-shift lever associated with the usual change-speed transmission and of an independently controllable rheostat.

Both the rheostat and the gear-shift lever operated switch will be described in detail hereinafter. By operation of the rheostat, the strength of the current supplied to the coil 31 may be controlled to vary the rapidity with which the main clutch is engaged; while the gear-shift-lever operated switch serves automatically to disengage the main clutch during the operation of gear-shifting.

The manually controllable rheostat which has been referred to comprises a movable member 36, conveniently in the form of a pedal mounted in the toe-board of the automobile. This pedal is yieldingly forced outwardly as by means of a spring 37. At its lower end, the pedal 36 enters a housing 38 and has mounted upon it a bridge-contact 39 extending transversely of the housing 38. Along the inner face of one wall of the housing 38 there extends a contact 40 adapted to be engaged by one end of the bridge-contact 29, and on the opposite wall of the housing there are mounted a series of spaced contacts 41. Between each pair of contacts 41 an electrical resistance 42 is connected.

By the electrical connections indicated in the drawings, the contact 40 is connected to one terminal of the coil 31, the other terminal of the coil being grounded. The lowermost contact 41 is connected to one pole of a battery 44, the other pole of which is grounded. To effect immediate disengagement of the main clutch, therefore, the pedal 36 may be completely depressed to a position in which the bridge 39 engages the lowermost contact 41, as well as the contact 40, and serves to connect the coil to the battery 44 without any interposed resistance. The resultant energization of the coil 31 operates as above described to disengage the main clutch. If it is desired to engage the main clutch gradually, the pedal 36 is permitted to move upwardly gradually under the influence of the spring 37. As the pedal 36 is gradually moved upwardly, a gradually increasing resistance is interposed in the circuit of the coil 31 to cause a gradual decrease of the strength of the current flowing in that coil. As a result of this action, the tendency of the magnetic-clutch member 28 to remain stationary is gradually rather than suddenly removed, and the rate at which the main clutch moves forwardly to clamp the driven clutch member 14 between it and the flywheel may be controlled.

I have previously referred to the possibility of controlling the automobile clutch by operation of the gear-shift lever. When such an arrangement is desired, the clutch-control coil 31 is connected to the battery 44 through a switch 50 which is controlled by movements of the gear-shift lever 51. To this end, the switch 50 is shown as comprising a fixed contact 52, and a movable contact 53, the latter being biased to a position in which it is out of engagement with the fixed contact 52. Whenever the contacts 52 and 53 are separated, no current will flow through the coil 31, and the clutch will be engaged.

For the purpose of effecting disengagement of the clutch, I connect to the gear-shift lever 51 a longitudinally slidable rod 56 having abutments 57 that receive between them the lower end of the gear-shift lever 51. Conveniently, the rod 56 is mounted in the casing 58 of the change-speed transmission, and the switch 50 is mounted at or near one end of such casing.

At the switch 50, the rod 56 is provided with three longitudinally spaced notches 60 adapted to receive a projection 61 on a slidable member 62 which actuates the movable contact 53 of the switch. A spring 54, acting on the member 62, tends to force it toward the rod 56. When any of the notches 60 are in alinement with the projection 61, the spring 54 operates to permit separation of the contact 53 from the contact 52. When, however, the projection 61 is out of alinement with any notch 60, the member 62 is depressed to cause engagement of the contact 53 with the contact 52.

The notches 60 are so arranged in the rod 56 that when the gear-shift lever 51 is in neutral position the projection 61 occupies the middle one of the three notches 60, and the two end notches 60 are so located as to be respectively in alinement with the projection 61 when the gear-shift lever is at the limits of gear-shifting movement.

From the above description, it will be apparent that when the gear-shift lever 51 is in its neutral position the contacts 53 and 52 are separated, and no current will flow through the clutch-control coil 31. As the result of this, therefore, the clutch will be engaged. When it is desired to shift gears, however, the initial gear-shifting movement of the lever 51 will depress the member 62 to cause engagement of the contacts 53 and 52, whereupon current will be supplied to the coil 31 and the clutch will be disengaged. As the gear-shift lever reaches the end of its gear-shifting movement, one of the end notches 60 will come into alinement with the projection 61 and will permit the switch-operating member 62 to move under the influence of the spring 54 to cause disengagement of the contacts 53 and 52. When this occurs, flow of current to the coil 31 will be interrupted, and the clutch will become engaged under the influence of the springs 18.

Either the pedal-operated rheostat or the switch 50 operated by the gear-shift lever may be used separately, or both may be used in combination to control the clutch. It will be apparent that by varying the pitch of the threads interconnecting the sleeve 25 and the element 28 the rate at which the clutch engages upon complete de-energization of the coil 31 may be controlled. I find it desirable to make these threads so steep that engagement of the clutch under these circumstances occurs rather abruptly, and then to embody in the clutch-controlling system the pedal-operated rheostat in order to secure a more gradual engagement of the clutch whenever that is desired.

While I have illustrated and described my invention as embodied in an automobile, and while the complete combination of the clutch with both gear-shift-lever and rheostat control is especially suitable for use in an automobile, I do not wish to be understood as limiting my invention to that particular use.

I claim as my invention:

1. In combination, a friction clutch having rotatable driving and driven members relatively axially movable into and out of engagement, yielding means tending to force said two clutch members into clutching engagement, clutch-controlling means including a clutch-control member axially movable in one direction to engage said friction clutch and in the other direction to disengage it, said clutch-control member being rotatable with said driving clutch member, a rotatable sleeve mounted in axially fixed position, reversible screw-threads operatively interconnecting said clutch-control member and said sleeve, and electro-magnetic brake means associated with said sleeve and operating when energized to oppose rotation of said sleeve, whereby upon rotation of said driven clutch member and said clutch-control member the friction clutch will be disengaged.

2. The invention set forth in claim 1 with the addition of a rheostat for controlling the current supplied to said electro-magnetic brake means.

3. In combination, a clutch having rotatable driving and driven members, clutch-controlling means including a clutch-control member movable in one direction to engage said clutch and in the other direction to release it, said clutch-control member being rotatable with said driving clutch member, a rotatable part associated with said clutch-control member, provisions operatively interconnecting said part and said clutch-control member to cause axial movement of said clutch-control member upon relative rotation of the clutch-control member and said part, and electro-magnetic means controlling relative rotation of said clutch-control member and said part.

4. In combination, a clutch having rotatable driving and driven members, clutch-controlling means including a clutch-control member movable in one direction to engage said clutch and in the other direction to release it, said clutch-control member being positively connected to said driving clutch member to rotate therewith at all times, a rotatable part associated with said clutch-control member, provisions operatively interconnecting said part and said clutch-control member to cause axial movement of said clutch-control member upon relative rotation of the clutch-control member and said part, and means controlling relative rotation of said clutch-control member and said part.

5. The invention set forth in claim 3 with the addition of a change-speed transmission mechanism driven by the driven member of said clutch, said change-speed transmission mechanism including a control member, and means operated by said control member for controlling the energization of said electro-magnetic means.

6. The invention set forth in claim 4 with the addition of a change-speed transmission mechanism driven by the driven member of said clutch, said change-speed transmission mechanism including a control member, and means operated by said control member for controlling the energization of said rotation-controlling means.

7. In combination, a clutch biased toward engagement, a change-speed transmission mechanism driven through said clutch, a control member movable to effect speed-changes in said transmission mechanism, electro-magnetic means for disengaging said clutch, mechanism operated by speed-changing movement of said control member for controlling said electro-magnetic means, and a rheostat for regulating the rate at which said electro-magnetic means is de-energized.

8. In combination, a clutch having relatively rotatable driving and driven members, a change-speed transmission mechanism operatively connected to said driven member to be driven thereby, yielding means tending to engage said clutch, power-driven means driven solely by rotation of the driving member of said clutch for causing clutch-disengagement in opposition to said yielding means, a movable control member for said transmission mechanism, and a device operated by movements of said control member for rendering said power-driven means operative or inoperative.

9. In combination, a clutch, a change-speed transmission mechanism driven through said clutch, a power-operated device for effecting engagement and disengagement of said clutch, a control member movable from one controlling position through a neutral position to a second controlling position to effect a speed-change in said transmission, and control mechanism associated with said control member and operated by movement thereof to cause said power-operated device to disengage said clutch when said control member is moved from its neutral position toward any controlling position.

JARL M. WEYDELL.